(12) United States Patent
Liu

(10) Patent No.: US 7,340,007 B2
(45) Date of Patent: Mar. 4, 2008

(54) APPARATUS, METHODS AND ARTICLES OF MANUFACTURE FOR PRE-EMPHASIS FILTERING OF A MODULATED SIGNAL

(75) Inventor: Frank Liu, Princeton, NJ (US)

(73) Assignee: M/A-COM, Inc., Lowell, MA (US)

( * ) Notice: Subject to any disclaimer, the term of this patent is extended or adjusted under 35 U.S.C. 154(b) by 735 days.

(21) Appl. No.: 10/663,136

(22) Filed: Sep. 16, 2003

(65) Prior Publication Data

US 2005/0058219 A1      Mar. 17, 2005

(51) Int. Cl.
*H04L 27/00* (2006.01)
(52) U.S. Cl. ...................................... 375/297
(58) Field of Classification Search ............... 375/295, 375/296, 285, 297
See application file for complete search history.

(56) References Cited

U.S. PATENT DOCUMENTS

| | | | | |
|---|---|---|---|---|
| 4,629,995 A | * | 12/1986 | Katakura ..................... | 330/149 |
| 5,386,590 A | * | 1/1995 | Dolan ......................... | 455/557 |
| 5,420,536 A | * | 5/1995 | Faulkner et al. ............ | 330/149 |
| 5,524,286 A | | 6/1996 | Chiesa et al. ............... | 455/126 |
| 5,598,436 A | | 1/1997 | Brajal et al. ................ | 375/297 |
| 5,687,101 A | * | 11/1997 | Lee ............................. | 702/190 |
| 5,905,760 A | | 5/1999 | Schnabl et al. ............. | 375/296 |
| 5,952,895 A | | 9/1999 | McCune, Jr. et al. ....... | 332/128 |
| 6,043,707 A | | 3/2000 | Budnik ........................ | 330/10 |
| 6,094,101 A | | 7/2000 | Sander et al. ................ | 331/17 |
| 6,125,266 A | | 9/2000 | Matero et al. ............... | 455/126 |
| 6,140,882 A | | 10/2000 | Sander ........................ | 331/25 |
| 6,147,553 A | | 11/2000 | Kolanek ...................... | 330/10 |
| 6,255,912 B1 | | 7/2001 | Laub et al. ................... | 331/25 |
| 6,324,220 B1 | * | 11/2001 | Sellars ........................ | 375/296 |
| 6,335,767 B1 | | 1/2002 | Twitchell et al. ........... | 348/608 |
| 6,449,465 B1 | | 9/2002 | Gailus et al. ................ | 455/126 |
| 6,621,340 B1 | | 9/2003 | Perthold et al. ............. | 330/149 |
| 6,674,856 B1 | * | 1/2004 | Hendricks et al. ...... | 379/399.01 |
| 6,834,084 B2 | | 12/2004 | Hietala ........................ | 375/296 |
| 6,940,916 B1 | * | 9/2005 | Warner et al. ............... | 375/261 |
| 2002/0098812 A1 | | 7/2002 | Sourour et al. ............... | 455/91 |
| 2002/0186783 A1 | | 12/2002 | Opas et al. .................. | 375/297 |
| 2002/0193085 A1 | | 12/2002 | Mathe et al. ................ | 455/126 |
| 2003/0031267 A1 | | 2/2003 | Hietala ........................ | 375/295 |

(Continued)

FOREIGN PATENT DOCUMENTS

EP        1 122 893 A1      8/2001

(Continued)

*Primary Examiner*—Jean B. Corrielus

(57) ABSTRACT

The invention is directed to a system for determining a transfer function for emphasizing an electromagnetic signal prior to being processed by determining a discrete transfer function for a processing system, such as a wideband phase modulator; determining a target transfer function such that the target transfer function multiplied by the inverse of the discrete transfer function produces a discrete pre-emphasis transfer function; and transforming any unstable poles and/or zeros in the pre-emphasis transfer function to stable poles and/or zeros. The discrete transfer function may be determined, for example, by using an S-function, input and output signals, the inverse-invariant method, and/or the Steiglitz-McBride algorithm. The transformation of the unstable poles and/or zeros may be accomplished using an all pass filter. The target transfer function may be a low pass FIR filter having a gain of about unity across substantially all of the frequency range of said FIR filter.

30 Claims, 7 Drawing Sheets

U.S. PATENT DOCUMENTS

| | | | |
|---|---|---|---|
| 2003/0095608 A1 | 5/2003 | Duperray | 375/297 |
| 2003/0215025 A1 | 11/2003 | Hietala | 375/297 |
| 2003/0215026 A1 | 11/2003 | Hietala | 375/297 |
| 2004/0008793 A1* | 1/2004 | Mujica et al. | 375/260 |
| 2004/0021517 A1 | 2/2004 | Irvine et al. | 330/151 |
| 2004/0047432 A1 | 3/2004 | Iwasaki | 375/297 |
| 2005/0017801 A1 | 1/2005 | Bachman, II et al. | 330/149 |
| 2005/0122164 A1 | 6/2005 | Brandt et al. | 330/10 |

FOREIGN PATENT DOCUMENTS

| | | |
|---|---|---|
| GB | 2 373 420 A | 9/2002 |

* cited by examiner

APPARATUS, METHODS AND ARTICLES OF MANUFACTURE FOR PRE-EMPHASIS FILTERING OF A MODULATED SIGNAL

FIELD OF THE INVENTION

The invention relates generally to electromagnetic processing of an electronic signal, and particularly, the invention relates to pre-emphasis filtering of a modulated signal, and more particularly to determination of pre-emphasis filtering of a phase modulated signal based upon the transfer characteristics of a phase modulator.

BACKGROUND OF THE INVENTION

Correcting errors that occur during the processing of electromagnetic waves and signals (hereinafter "waves") is sometimes difficult. These waves may be used for many different purposes. For example, they may be processed in order to convey intelligence, such as by attenuating and/or amplifying electromagnetic wave characteristics, for instance, as is seen when modulating amplitude, frequency or phase of an electrical current or radio frequency (RF) wave to transmit data. As another example, power may be conveyed along a wave in a controlled fashion by attenuating and/or amplifying electromagnetic wave characteristics, such as is seen when modulating voltage or current in a circuit. Moreover, the uses may be combined, such as when intelligence may be conveyed through a wave by processing power characteristics.

Because low frequency waves, such as 60 Hz power waves, may need different processing techniques than high frequency waves such as 24 GHz radar waves, it is common practice to use different components, with different characteristics, for different waves. For example, a switching semiconductor used within a computer for 60 Hz power waves has different power handling characteristics from a power semiconductor used in a 24 GHz radar system. Each of these systems may produce errors in the processed signal, however, due to errors that may be introduced into some of the characteristics of the electromagnetic wave during signal processing.

For example, in phase modulation systems, errors may occur in the phase of the output signal from errors introduced during the modulation process. In these wave processing systems and others, filtering during phase modulation may add phase noise to the signal, or may undesirably slow tracking of the signal phase, or may suppress certain frequency components in the outputted signal. This may be particularly true in wideband phase modulation system, such as code division multiple access system (e.g., CDMA, WCDMA, CDMA2000) due to limitations in the frequency response of the phase modulator as compared with the desired wideband transmission signal.

Because of this, the portion of the input signal to be modulated may be subjected to a pre-emphasis filtering to correct for these errors (such as by expanding the frequency response of the phase modulator), which may be determined based upon expected output characteristics in the modulated signal.

Accordingly, it would be helpful to the art of electromagnetic processing to provide efficient, and at the same time, accurate techniques for correcting electromagnetic waves during signal processing to improve the pre-emphasis filtering of a modulated input signal.

SUMMARY OF THE INVENTION

Embodiments of the invention include apparatus, methods and articles of manufacture for automatically adapting electromagnetic waves during signal processing. The invention may include a system for determining a transfer function used for emphasizing a portion of an electromagnetic signal prior to being processed by determining a discrete transfer function for a processing system; determining a target transfer function such that the target transfer function multiplied by the inverse of the discrete transfer function produces a discrete pre-emphasis transfer function; and transforming any unstable poles and/or zeros in the pre-emphasis transfer function to stable poles and/or zeros.

In one embodiment, the discrete transfer function may be determined using one or more selected from the group consisting of an S-function, input and output signals, the inverse-invariant method, and the Steiglitz-McBride algorithm. The transformation of the unstable poles and/or zeros may be accomplished using an all pass filter. The target transfer function may be a low pass FIR filter having a gain of about unity across substantially all of the frequency range of said FIR filter.

While the processing system is not particularly limited, it may comprises one or more selected from the group consisting of phase modulation, wideband phase modulation, wideband fractional sigma delta modulation, and wideband fractional sigma delta modulation for a code division multiple access signal.

BRIEF DESCRIPTION OF THE DRAWINGS

The invention will be more fully understood from the following detailed description taken in conjunction with the accompanying drawings in which.

DETAILED DESCRIPTION OF THE INVENTION

Embodiments of the invention include apparatus, methods and articles of manufacture for the pre-emphasis filtering of a signal to be modulated during signal processing. For illustration purposes, one embodiment may comprise an infinite impulse response filter based upon the S-function or input/output signals of a wideband phase modulator. The system disclosed herein may be used, however, with a wide range of wave processing systems and is not limited to the phase modulation systems as disclosed herein. The system may also be used in a wide range of applications, such as, for example, receivers, transducers, and the like, and is not limited to transmitters.

The term "signal" as is used herein should be broadly construed to include any manner of conveying data from one place to another, such as, for example, an electric current or electromagnetic field, including without limitation, a direct current that is switched on and off or an alternating-current or electromagnetic carrier that contains one or more data streams. Data, for example, may be superimposed on a carrier current or wave by means of modulation, which may be accomplished in analog or digital form. The term "data"

as used herein should also be broadly construed to comprise any type of intelligence or other information, such as, for example and without limitation, audio, such as voice, text and/or video, etc.

Figure 1:
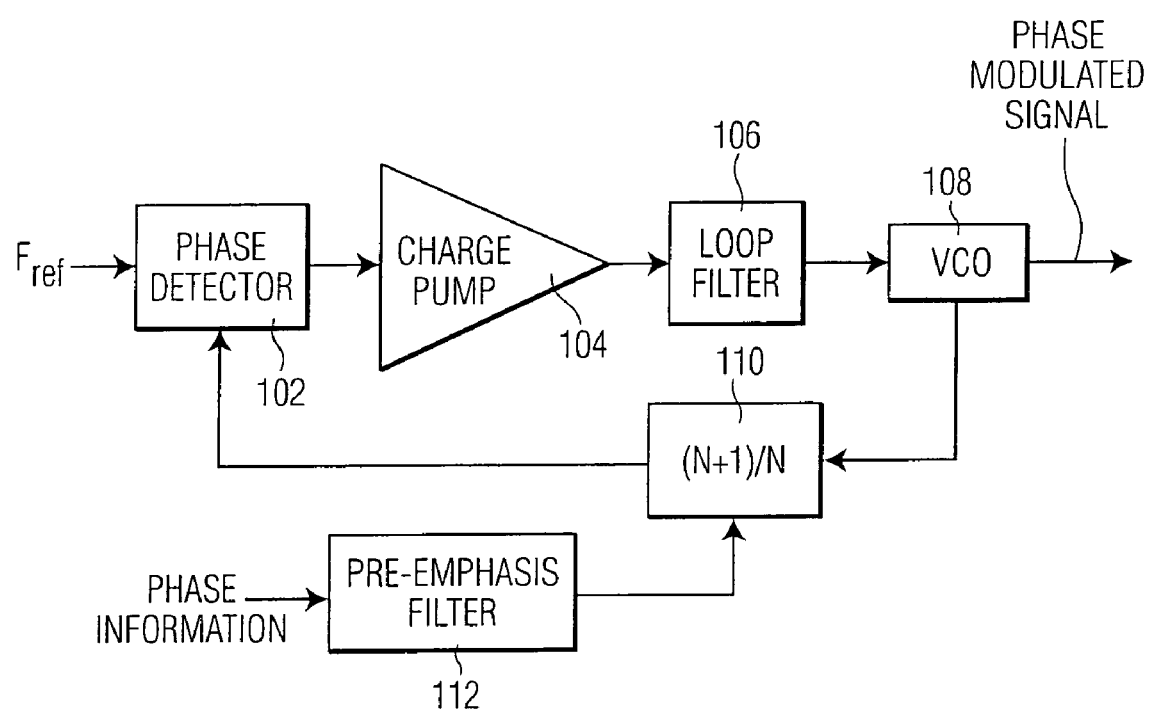
FIG. 1 is a schematic diagram illustrating phase modulating system.

One embodiment of a phase modulator is illustrated in FIG. 1. As shown in FIG. 1, such a system for processing electromagnetic waves may include phase/frequency detector 102, charge pump 104, loop filter 106, voltage controlled oscillator (VCO) 108, and divider 110, which form a phase locked loop (PLL). In this system, a carrier wave, $F_{ref}$, may be modulated by the phase information from a baseband information signal to produce a phase modulated signal.

PLL's are often used as frequency synthesizers in many applications where it is necessary to generate a precise signal frequency with low spurs and good phase noise. The signal frequency of VCO 108 may be changed by varying the divide ratio of divider 110. The reference signal is very often produced by a stable oscillator whose frequency cannot be varied, so the divide ratio is changed in integer steps to change the VCO frequency, where the output frequency is equal to the divider ratio times the carrier wave frequency.

Phase/frequency detector 102 and charge pump 104 deliver either positive or negative charge "pulses," depending on whether the reference signal phase leads or lags the divided VCO signal phase. These charge pulses are integrated by loop filter 106 to generate a tuning voltage. The tuning voltage changes the VCO frequency up or down until the phases of the reference signal and divided signal are synchronized.

Often, a loop filter may introduce undesired error or noise into the outputted processed signal. For example, in CDMA2K transmitter design, a loop filter in the phase modulator may have a cutoff frequency in the range of several hundred kHz, wherein the bandwidth of the outputted phase modulated signal is in the range of several MHz (this is in contrast to some other systems, such as those using GSM, for example, which have a narrower frequency range). In this and similar systems, a pre-emphasis filter 112 may be used to expand the bandwidth of the phase signal before being fed to divider 110 in the PLL of the phase modulator.

Loop filter 106 (along with the charge pump 104 and VCO 108) determines the frequency response of the phase modulator. A loop filter with a wider passband has faster tracking of the phase information, but adds more phase noise. Conversely, a loop filter with a more narrow passband has slower tracking of the phase information, but adds less phase noise. Because of this tradeoff between tracking time and phase noise, loop filters are typically designed to have a cutoff frequency of about 500 kHz. However, as previously noted, in some systems, such as CDMA2K, the phase signal has a wider frequency bandwidth on the order of several MHz. Thus, a loop filter without a pre-emphasis will suppress a large portion of the high frequency components of the phase signal.

Figure 2:
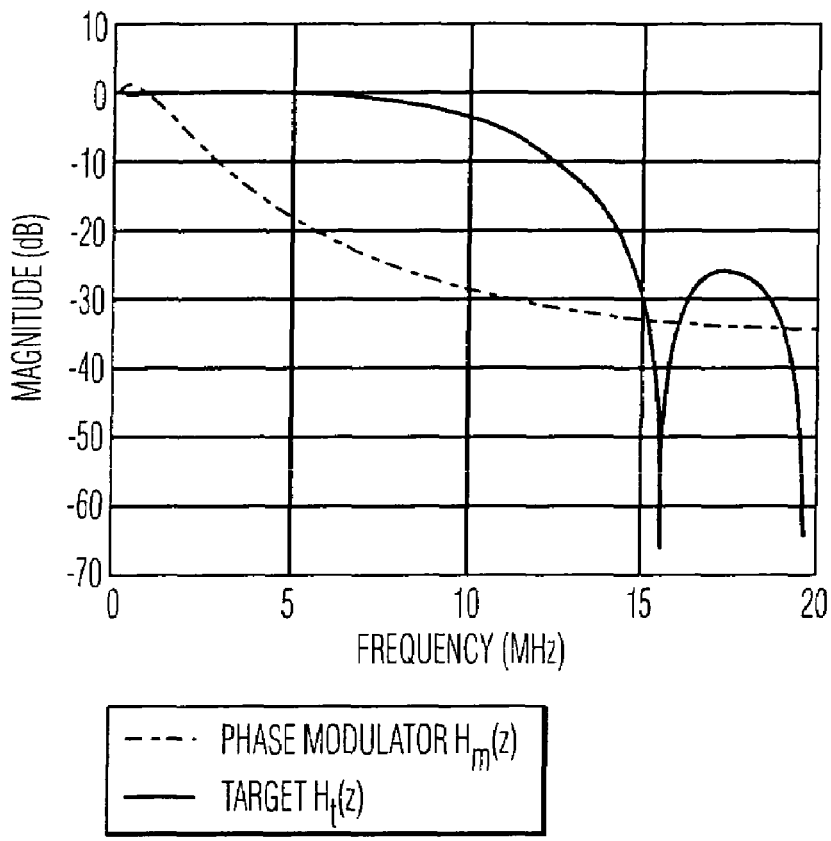
FIG. 2 is a chart illustrating a phase modulator and target transfer function.

As a result, a pre-emphasis filter is typically used to expand the frequency band by increasing the magnitude of the frequency response in the high frequency band so that the gain of the outputted modulated signal from the phase modulator is substantially unity over a desired target wide signal frequency band. This is further illustrated in FIG. 2.

The type of filter used for pre-emphasis filter 112 is not particularly limited, and may comprise, for example, a finite impulse response (FIR) or infinite impulse response (IIR) filter. However, FIR filters have the disadvantage that higher order filters may consume more power and require a larger ASIC die size than a similar IIR filter due to the large number of taps needed for the filter.

Thus, in one embodiment, an IIR filter may be used for the pre-emphasis filter. This filter may be based upon the overall transfer function of the phase modulator, which may be derived in any number of ways, such as from either the S-function of the phase modulator or input and output signals of the phase modulator. For example, a sigma-delta fractional-N phase modulator may have a discrete transfer function, shown in equation 1 below:

$$H_m(z) = \frac{Bm(z)}{Am(z)} = K \prod_{i=1}^{N} \frac{(z - z_{mi})}{(z - p_{mi})} \quad \text{(Eq. 1)}$$

where K is a DC gain, $z_{mi}$ and $p_{mi}$ are zeros and poles, respectively, and $H_m(z)$ is a low pass filter with a cutoff frequency in the range of several hundred kHz.

If the transfer function of the phase modulator is as in equation 1, then a pre-emphasis filter may be may be designed, such that:

$$H_p(z)H_m(z)=H_t(z) \quad \text{(Eq. 2)}$$

where $H_p(z)$ is the pre-emphasis transfer function, and $H_t(z)$ is a transfer function of the targeted cascaded network, that is the desired overall transfer function for the system. For example, the desired target transfer function may be pre-defined to be an FIR low pass filter with a unit gain and a cutoff frequency in the range of several MHz, although not limited thereto. In this case, the pre-emphasis filter transfer function may be obtained by inverting the discrete transfer function of the phase modulator and combining it with the target transfer function as follows:

$$H_p(z) = H_t(z)H_m^{-1}(z) \quad \text{(Eq. 3)}$$

$$= H_t(z)1/k \prod_{i=1}^{N} \frac{(z - p_{mi})}{(z - z_{mi})}$$

Because the target transfer function is typically an FIR filter and it has only zeros, the pre-emphasis transfer function has poles at $z_{mi}$ that are the zeros of $H_m(z)$ (because of the inversion). If the phase modulator transfer function is not minimum phase (i.e. all zeros are not restricted to the left half s-plane), which is true in most cases, it has some zeros located outside of the unit circle, $|z_{mi}|>1$. Accordingly, the pre-emphasis filter transfer function will have poles outside the unit circle, and $H_p(z)$ will not be a stable system.

In order to make the pre-emphasis filter transfer function stable, the unstable poles should be removed. However, the frequency response of the pre-emphasis filter should preferably remain unchanged in removing these poles. One mechanism for accomplishing this is discussed below.

An all pass filter may have the transfer function defined in equation 4 below:

$$H_a(z) = \frac{(z - a)}{(1 - a^*z)} \quad \text{(Eq. 4)}$$

where a* is a complex conjugate of a.

Figure 3:
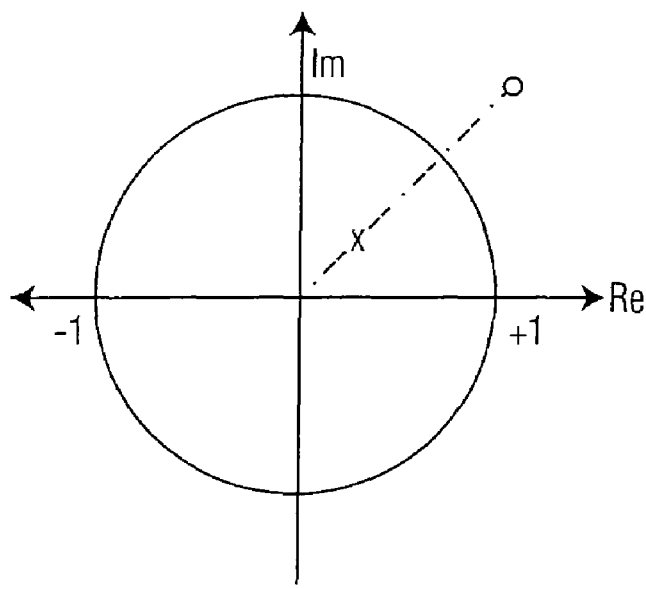
FIG. 3 is a chart illustrating an all pass filter pole/zero location.

A stable all pass filter has a pole at 1/a* that is located inside the unit circle |1/a|<1, and a zero at a, located outside of the unit circle, |a|>1. This is illustrated graphically in FIG. 3. The magnitude of the frequency response of the ideal all pass filter is 1 for the entire frequency spectrum. In this situation:

$$|H_p(z)H_a(z)|=|H_p(z)| \quad \text{(Eq. 5)}$$

In practice, the magnitude of the frequency response of the pre-emphasis filter is kept unchanged except for some phase change.

If the pre-emphasis filter transfer function, $H_p(z)$, has a pole located outside of the unit circle, $|p_o|>1$, then this transfer function may be factored as follows:

$$H_p(z) = H_{ps}(z)\frac{1}{(z-p_o)} \quad \text{(Eq. 6)}$$

The pre-emphasis filter may then be cascaded by an all pass filter, as shown in equation 7 below:

$$H_a(z) = \frac{(z-p_o)}{(1-p_o^*z)} \quad \text{(Eq. 7)}$$

Combining equations 6 and 7 produces equation 8 below:

$$H_{pa}(z) = H_p(z)H_a(z) \quad \text{(Eq. 8)}$$
$$= H_{ps}(z)\frac{1}{(1-p_o^*z)}$$
$$= H_{ps}(z)\left(-\frac{1}{p_o^*}\right)\frac{1}{(z-(p_o^*)^{-1})}$$

It is apparent from these equations that the unstable pole at $p_o$ may be replaced with a stable pole at $(1/p_o^*)$, which may be multiplied by a gain of $(-1/p_o^*)$. By doing this, the unstable pole is "pulled" back into the unit circle, which results in a stable pre-emphasis filter transfer function. If the pre-emphasis filter transfer function has multiple unstable poles, all of them may be pulled back into the unit circle in this manner.

The discrete transfer function for the phase modulator as discussed above, $H_m(z)$, may be determined in any number of ways, such as from a continuous time S-function or from the use of input and output signals through the phase modulator. For example, a continuous time S-function for the phase modulator, $H_m(s)$, may be expressed as a partial-fraction expansion of first-order terms:

$$H_m(s) = \sum_{i=1}^{N} \frac{A_i}{(s-s_i)} \quad \text{(Eq. 9)}$$

This function may be converted into a discrete transfer function in a number of ways, such as by using the impulse-invariant method. As is well known to those of ordinary skill in the art, the impulse-invariant method maps the impulse response of the filter in both the analog and digital domains.

Thus, applying this method to the continuous time S-function produces a discrete transfer function as follows:

$$H_m(z) = \sum_{i=1}^{N} \frac{TA_i}{1-e^{s_iT}z^{-1}} \quad \text{(Eq. 10)}$$

where T is a sampling interval. The pole, $s_i$, in the S-domain may be mapped to a pole $z_i$ in the z-plane via the relation:

$$z_i = e^{s_iT} \quad \text{(Eq. 11)}$$

Alternatively, if a closed form S-function for the phase modulator is not available, a discrete transfer function may be obtained by passing an input signal through the system and identifying the input and output signal characteristics. For example, the Steiglitz-McBride algorithm may be used to identify the discrete transfer function from these signals. As is well known to those of ordinary skill in the art, the Steiglitz-McBride algorithm is an iterative algorithm that uses the input and output signals of a system to provide an approximation of a system's response.

The system of the invention may be further explained using a specific design example. Those of ordinary skill in the art will appreciate, however, that this example is provided for purposes of explanation only, and that the invention is not limited thereto.

In this example, a phase modulator has a fourth order S-function $H_m(s)=B_m(s)/A_m(s)$, where the denominator and numerator polynomials are: $B_m$=[0, 0, 0, 0.0233986088102633, 12744.3403106009]; and $A_m$= [1.272348e-024, 8.11593e-016, 7.23e-009, 0233986088102633, 12744.3403106009]. The target discrete transfer function for the system, $H_t(z)$, is a fifth order symmetric FIR filter having the following coefficients: [−0.0798679590688931, 0.0943951888467198, 0.488574943617655, 0.488574943617655, 0.0943951888467198, −0.0798679590688931].

The analog phase modulator S-function $H_m(s)$ may be converted to a discrete transfer function, $H_m(z)$, via the aforementioned impulse-invariant method with a sampling interval of T=16*1.2288 MHz. Its zeros are [0, −3.85403625471938e+015, 0.972699691892029, −0.0262884086904271]. Its poles are [0.9662666880065, 0.802795952379248+0.103250547052151i, 0.802795952379248−0.103250547052151i, 1.28357452895155e-014]. Thus one of the zeros is located outside of the unit circle.

Figure 4A:
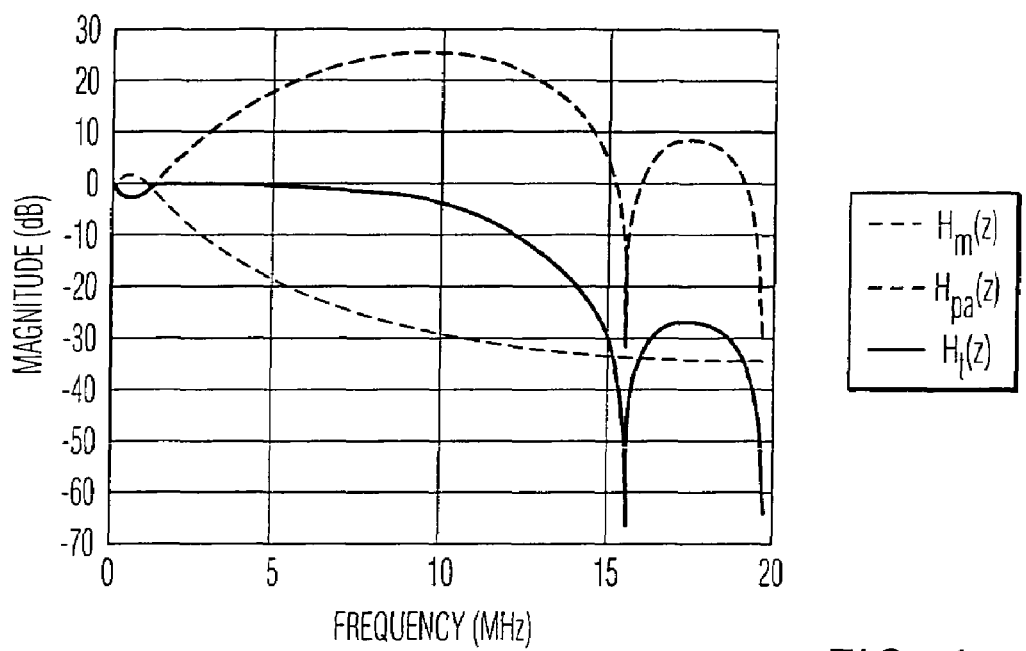
FIGS. 4(a)-(b) are charts illustrating the frequency responses of discrete transfer functions.
Figure 4B:
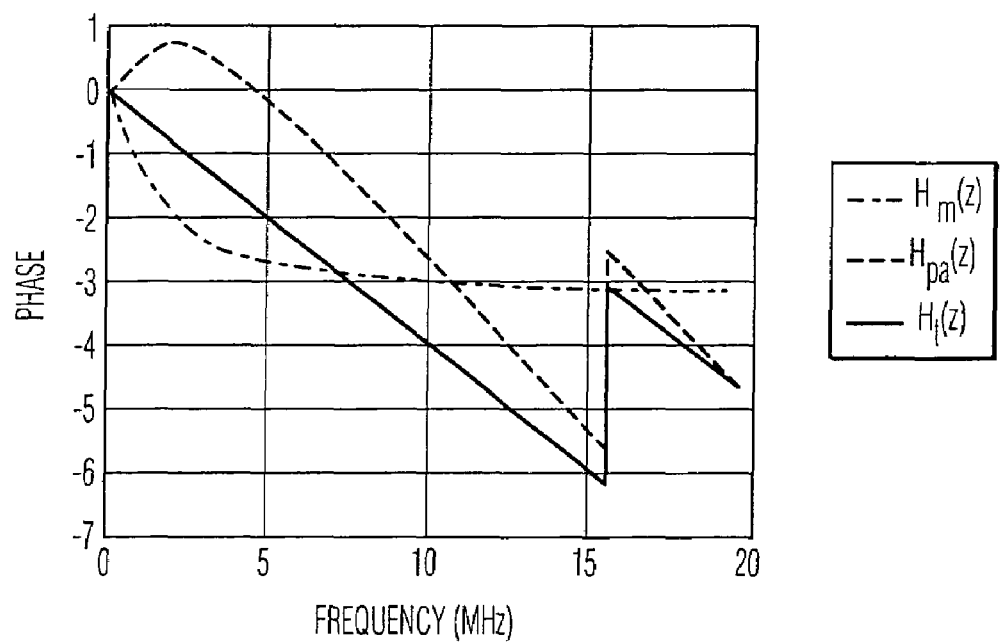

Next, equation 3 may be applied to compute the pre-emphasis filter transfer function $H_p(z)=H_t(z)H_m-1(z)$. An all pass filter (equations 7 and 8) may then be used to "pull" any unstable poles of $H_p(z)$ into the unit circle. This results in a stable pre-emphasis filter $H_{pa}(z)$, which, when combined with the transfer function of the phase modulator yield the desire target transfer function for the system. The frequency responses of the discrete transfer functions used in this example are illustrated in FIGS. 4(a) and (b).

Figure 5:
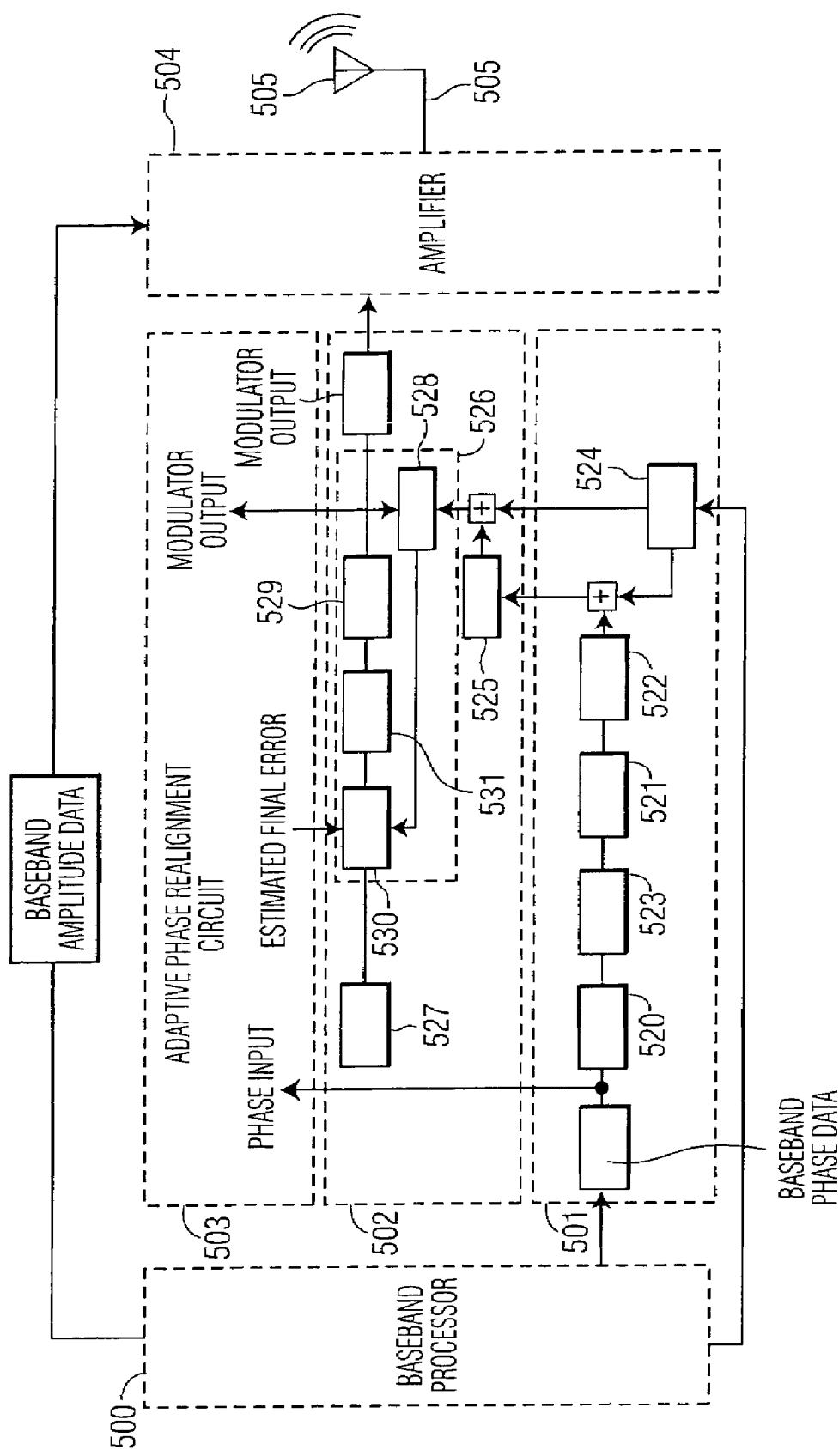
FIG. 5 is a block diagram illustrating a phase modulation system.

FIG. 5 illustrates the operation of the invention in the context of a signal transmitter, which incorporates a pre-emphasis system used in connection with a wideband phase modulator in accordance with an embodiment of the invention. The transmitter illustrated in FIG. 5 may include, for example, a baseband processor 500 adapted for receiving an input signal and producing amplitude and phase information for the signal, a phase signal processor 501, wideband phase modulator 502, an adaptive phase re-alignment component 503, power amplifier 504 and one or more load lines 505 connected to an antenna 506.

Baseband processor 500 may be, for example, a digital signal processor capable of generating a power control signal and a data control signal in response to the input signal, which may be, for example, a baseband signal. Data control signals may be passed from baseband processor 500 to phase signal processor 501 and to amplifier 504. In one embodiment, I,Q data may be converted by baseband processor 500 into an analog or digital data control signal that contains the amplitude wave characteristic of the input signal ("$A_m$"), and an electromagnetic signal that contains the phase wave characteristic of the input signal ("$A_p$"). For example, a rectangular to polar converter may be used to output polar coordinates in the form (R, theta) where the R coordinate represents the amplitude characteristic of the wave, and the theta coordinate represents the phase characteristic of the wave.

The amplitude characteristics, $A_m$, of the original input signal may be modulated as a control signal, such as a series of digital pulses comprising a digital word of varying lengths in various embodiments, which is used to control the amplification in power amplifier 504 of the signal outputted from phase modulator 502.

The phase characteristic, $A_p$, in turn, may be processed separately and then applied to power amplifier 504. For example, phase signal $A_p$ may be passed to wideband phase modulator 502, where the phase characteristic information may be modulated onto a carrier signal in the manner previously described and then sent to power amplifier 504, where it may be regulated by the data control signal $A_m$ in order to generate an output signal for transmission that is an amplified version of the input signal.

The phase data from the input signal, $A_p$, may be first passed through a data scaling processor 520, which scales amplitude of the data signal appropriately. The change in signal amplitude produced by data scaling processor 520 may be calculated to compensate for any unwanted gain that may be introduced in the output signal from wideband modulator 502. The scaling of the signal may be accomplished through any conventional means compatible with the data format. For example, if the phase data signal is digital, scaling may be accomplished by digital processing. In this embodiment, wideband modulator 502 is inherently a frequency modulator, so that translation of data for frequency and phase representations of the data occurs via $d\theta/dt$ 523.

The phase component signal may then be passed through a modulation compensation (equalization) filter 121, which is calculated to have a magnitude and phase response that is the inverse of the closed loop response of wideband modulator 502. As discussed above, in some instances, modulator 502 has an inherent design bandwidth to minimize noise in the signal. Limiting of the bandwidth in this manner, however, may cause a roll-off, that is, diminution, of the higher frequency components of the signal. Equalization filter 521 and overall modulation response filter 522 may compensate for roll-off by increasing the gain of these higher frequency components, thus producing a more even (flattened) frequency response for the system and effectively extending the modulation bandwidth of wideband modulator 502.

Equalization filter 521 is preferably implemented digitally, using a digital signal processor, although not limited thereto, and may be either a FIR (finite impulse response) or IIR (infinite frequency response) filter, as examples. The phase component data may also be passed through overall modulation response filter 522, which is calculated to set the overall passband response of wideband modulator 502 (e.g., 4 MHz). Overall modulation response filter 522, similar to equalization filter 521, may be an analog or digital FIR or IIR filter. Functionally, filters 521 and 522 may be combined into a single filter where desired. The transfer function of the filter(s) may be designed using the system described above, so as to provide the proper pre-emphasis to the phase signal information to produce a output signal from phase modulator 502 that is unity across the desired frequency band.

In the embodiment disclosed herein, the baseband input signal may be modulated onto a carrier wave of a selected center frequency in wideband modulator 502. The center frequency about which a given signal is to be modulated is determined by a channel calculation, by which the carrier wave frequency (e.g., 1880 MHz) is divided by the frequency of the reference source to establish a channel for the signal.

In this embodiment, the channel calculation yields a number that has an integer part and a fractional part. As shown in FIG. 5, channel calculator 524 received the channel number from baseband processor 500 and determines a selectable non-whole number (e.g., 23.5 to 24.5) by which the carrier wave of wideband modulator 502 is to be divided, allowing the selection of a channel in which the phase data signal is to be modulated. The fractional portion of this number may then combined with the data signal, which is passed to sigma delta modulator (SDM) 525 in wideband modulator 502. (This fractional portion may also be used to provide channel information to adaptive phase re-alignment component 503, as well).

SDM 525 may be used in connection with phase-locked loop (PLL) 526 to achieve wideband modulation of the input signal onto a carrier wave. SDM 525 serves to randomize and oversample the inputted phase data, with the average of multiple samples of the output being equal to the input. The SDM 525 in this embodiment operates in a manner so that inherent quantization noise from the digitizing process may be frequency shaped, so that at the desired frequencies, the noise is low.

SDM 525 may comprise, for example, a series of adders/accumulators and feedback components for inputting the fractional phase/channel number data (which may be an analog or digital signal) and outputting a digitized series of integers that correspond to the fractional input. The SDM 525 may be configured so that the input range is sufficient for phase modulation data as well as the fractional portion of the channel number. For example, SDM 525 may be a three bit system, which is thus capable of producing eight different output numbers (e.g., −3, −2, −1, 0, 1, 2, 3, and 4), although as should be understood, SDM 525 may comprise any desired number of bits or elements. SDM 525 may produce four output integers for each sample of the input, yielding an oversampling rate of four times the input. Sampling of the input modulating data in SDM 525 in this manner may introduce noise on the input modulating signal. Any such noise may be filtered by low-pass loop filter 531 in PLL 526. The circuit topology for SDM 525 is not particularly limited, but may include a MASH III topology or a 3rd Order Loop topology, for example. As should be understood, however, other suitable circuit topologies may also be utilized for the SDM 525 where desired.

The output of SDM 525 in the illustrated embodiment may then be combined with the integer portion of the channel number received from channel calculator 524. In the example discussed herein, the combination would produce a number from 20 to 28. The combination of the fractional and integer portions of the channel number may be inputted to divider 528 in this embodiment and used to lock PLL 526 to the desired RF carrier.

The PLL 526 in the illustrated embodiment may be used to modulate a wave signal synthesized by an RF carrier wave signal source, such as carrier wave source 529, using the phase portion of the input signal. Carrier wave source 529 may be any source of electromagnetic waves that is capable for producing a carrier wave, such as a radio frequency voltage-controlled oscillator (VCO).

The frequency of reference source 527 (or a division thereof by some number) may be compared with the output frequency of carrier wave source 529, divided by the series of numbers received by divider 528 from SDM 525 and channel calculator 524. Reference source 527 may comprise a VCO of a constant or substantially constant frequency or may be derived from a source at another frequency.

Phase-frequency detector (PFD) 530 may be used to compare the relative phases of the two signals and then output a signal that is proportional to the difference (phase shift) between them. This output signal may be utilized to adjust the frequency of carrier wave source 529, so that the phase difference measured at PFD 530 is substantially close and preferably equal to zero. Hence, the phase of the signal is locked by the feedback loop to prevent unwanted drift of the signal phase, due to variations in the phase and frequency of carrier wave source 529.

A feedback signal from carrier wave source 529 may be passed through divider 528, with the division ratio of the divider controlled by the series of numbers representing the phase component information received from SDM 525 and the channel information received from channel calculator 524. The resulting signal may be passed to PFD 530, where it is compared with the signal from reference source 527, as noted above. This combined signal may be passed through low-pass loop filter 531, and combined with the carrier wave signal of carrier wave source 529.

SDM 525 is being utilized to perform wideband modulation of the phase data input to SDM 525. Since the phase data input to SDM 525 may not be constant, synchronizing SDM 525 to the output of divider 528 may introduce a frequency offset that is dependent on the modulation signal. Accordingly, it may be desired in certain embodiments that SDM 525 and divider 528 be synchronized by reference source 527.

Before the equalization filter 521, the phase characteristic information $A_p$ may also be sent to an adaptive phase re-alignment component 503 to be used in phase re-alignment. For example, adaptive phase re-alignment component 503 may be used to dynamically adjust the PLL response, to ensure that the equalization filter 521 and the closed loop response of the PLL 526 are closely matched. Adaptive phase re-alignment component 503 may measure the output phase of wideband modulator 502 and compare it to a theoretically perfect version that is derived from the baseband input data and the center frequency information received from channel calculator 524. The result of this comparison is used to adjust the loop gain of PLL 526 in wideband modulator 502. This feedback system operates to minimize the error in the transmitted signal. Adaptive phase re-alignment component 503 preferably operates while the PLL is in service and reduces the need for manual calibration of the system.

The phase modulated carrier wave may also be passed to power amplifier 504 to be amplified. The amplitude portion of the input signal may be passed to power amplifier 504. The amplitude portion of the input signal may be used to produce an output current from power amplifier 504 that represents an amplified carrier wave carrying the intelligence contained within the input signal.

Figure 6A:
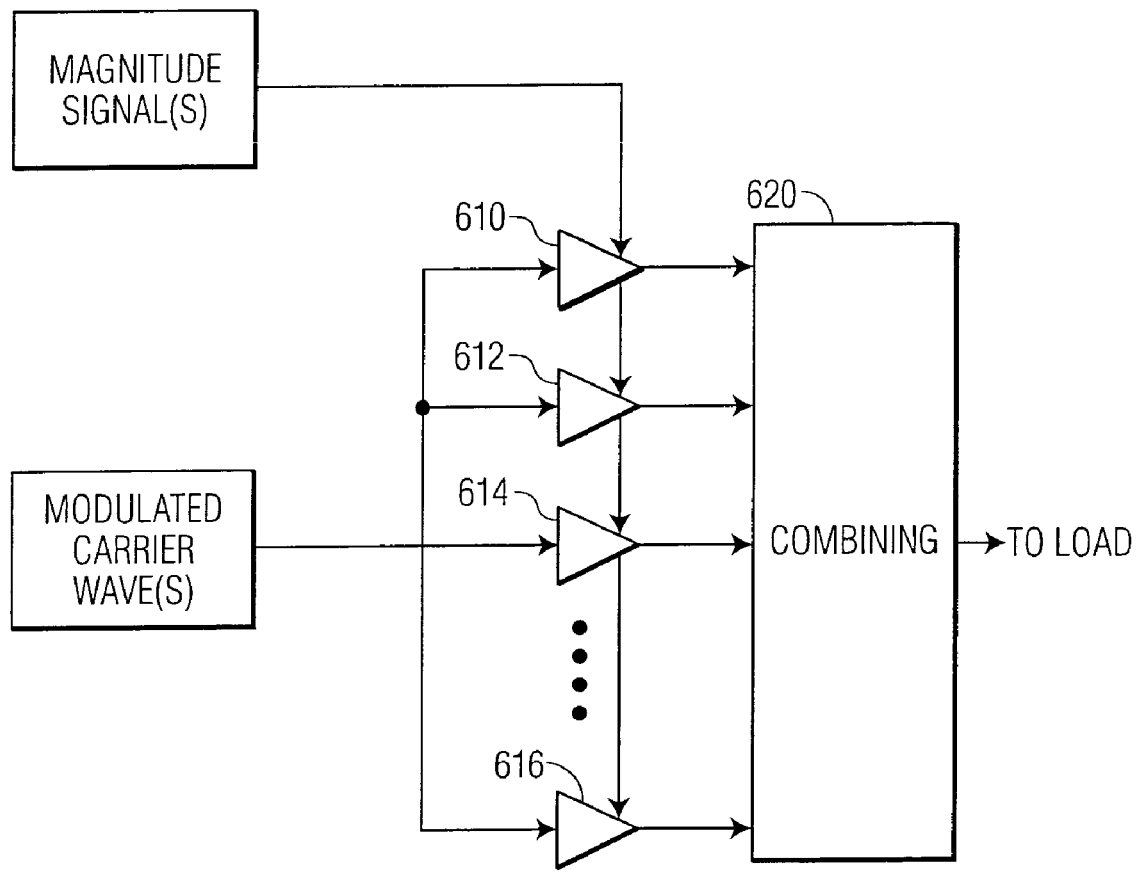
FIGS. 6(a)-(b) show an embodiment of amplifying segments.

One manner of accomplishing this is as follows. The amplitude component of the input signal, Am, outputted from baseband processor 500 may comprise digital pulses forming a digital word that may be quantitized into bits, with a Most Significant Bit ("MSB") to Least Significant Bit ("LSB"). The digital word may be of varying lengths in various embodiments. In general, the longer the word the greater the accuracy of reproduction of the input wave. This digital word may provide control for amplification. This is further illustrated in FIGS. 6(a)-(b) As shown in FIG. 6(a), the amplifier may include power amplifying segments 610-616. These may comprise, for example, power amplifiers, although not limited thereto. Each of the power amplifying segments may or may not produce an output depending on the control signal received by it. The phase modulated signal may be inputted into each segment.

The output of each power amplifying segment may then be combined in combining circuit 620, creating an output signal to drive the load. Combining circuit 620 is not particularly limited, and may comprise any mechanism for combining the output from each power amplifier, such as by using power transformers, quarter-wave transmission lines, discrete LC components (e.g., Pi-networks), and the like.

Figure 6B:
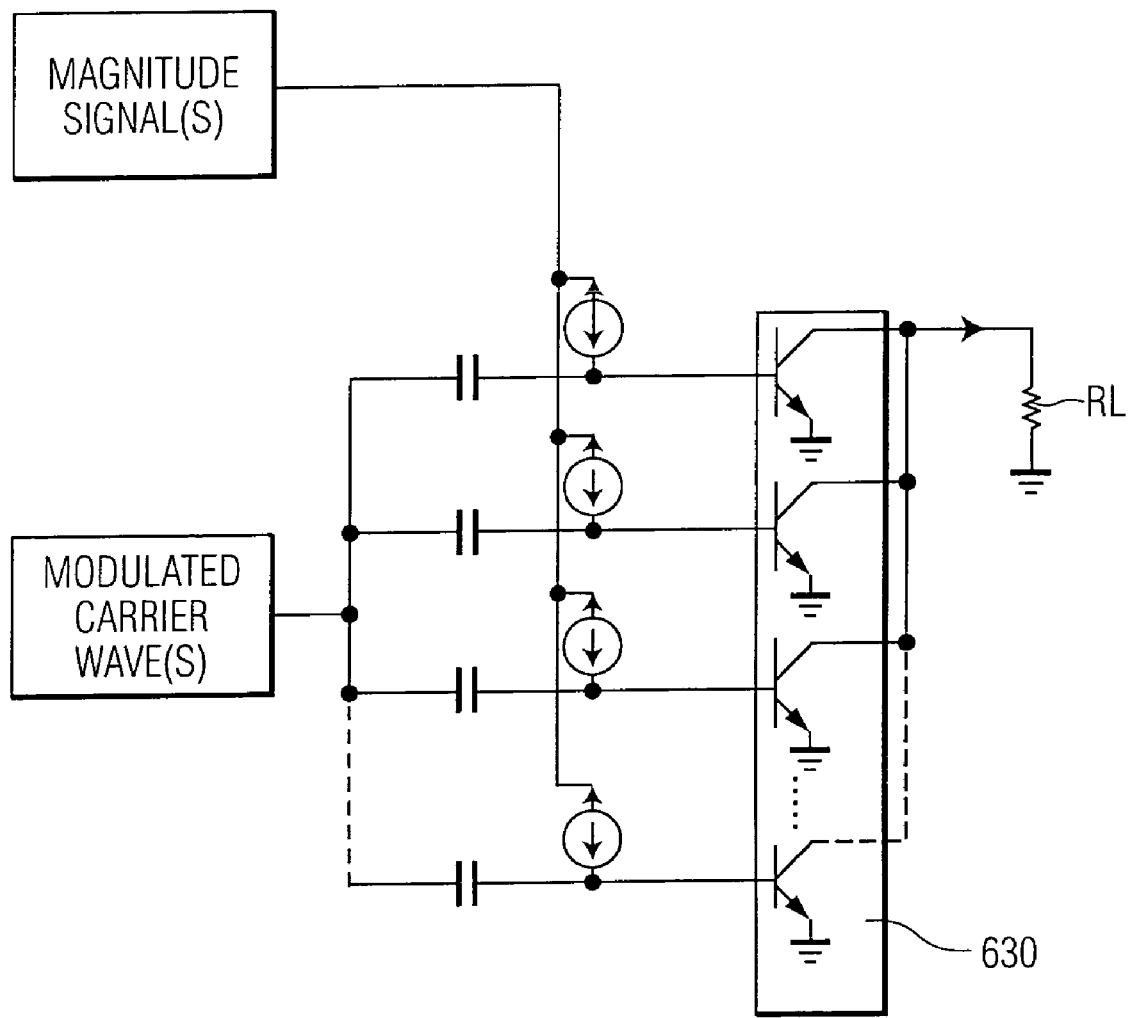

As shown in FIG. 6(b), the amplifier may also contain segmented transistor 630, segment of which may serve as a potential current source. Each amplifying segment may or may not act as a current source, because it is regulated via the appropriate digital signal for regulating that control component, and activation of a segment is dependant upon the value of the control signal, and concomitant regulation of the appropriate control component. The transistors and segments may be an HBT transistor. Other transistors may be used as well, such as FET, etc., as well as other current or wave characteristic sources. Other components may be interposed as well, e.g., a driver before transistor 430, a VGA to reduce the drive current to the transistor segments, etc.

Segments may be switched on and off by bits of the digital word output from the amplitude component and so regulated by the digital word output from the amplitude component. For example, if a bit is "1" or "high," a corresponding control component is switched on, and so current flows from that control component to the segment. As had been noted above, the length of the digital word may vary, and so the number of bits and control segments may vary accordingly in various embodiments. Additionally embodiments may comprise a single bit length word.

In one embodiment, the segments may be varied in size. For example, the first segment may twice the size of the next segment, which in turn may be twice the size of the next segment, and so on until reaching the final segment. The largest segment a may be controlled by the MSB of the amplitude word, the next bit of the word to the next largest segment, etc., until the LSB, which may be sent to the smallest segment. Of course, as had been noted above, other embodiments may have a different pattern of matching bit to segment. In other embodiments, other wave characteristics may be fed to another source of wave characteristics and so regulate that source.

Once the signal is amplified, it may be passed into load line 505 (FIG. 5). Load line 505 may be chosen, as is known in the art, to provide a match for antenna 506. Antenna 506 then radiates the output signal.

In some embodiments, for example, with certain transmitter, receiver, and transceiver embodiments, the components described herein may be specialized for particular input signals, carrier waves and output signals, e.g. various types of cell phones, such as CDMA, CDMA2000, W-CDMA, GSM, TDMA, as well as various other types of devices, both wired and wireless, e.g. Bluetooth, 802.11a, -b, -g, radar, 1xRTT, radios, GPRS, computers and computer or non-computer communication devices, handheld devices, etc. The modulation scheme that may be used in implementations of the invention is not limited and may include, for example, GMSK, which is used in GSM; GFSK, which is used in DECT & Bluetooth; 8-PSK, which is used in EDGE; OQPSK & HPSK, which are used in IS-2000; p/4 DQPSK, which is used in TDMA; and OFDM, which is used in 802.11.

Embodiments may utilize both analog and digital components, where desired, insofar as these embodiments manipulate waves and signals requiring both. For example, cell phone embodiments may utilize both analog and digital components. Various types of system architectures may also be utilized for constructing the embodiments. For example, embodiments or various components may be provided on a semiconductor device where desired, such as an integrated circuit or an application-specific integrated circuit composition; some examples include silicon (Si), silicon germanium (SiGe) or gallium arsenide (GaAs) substrates.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
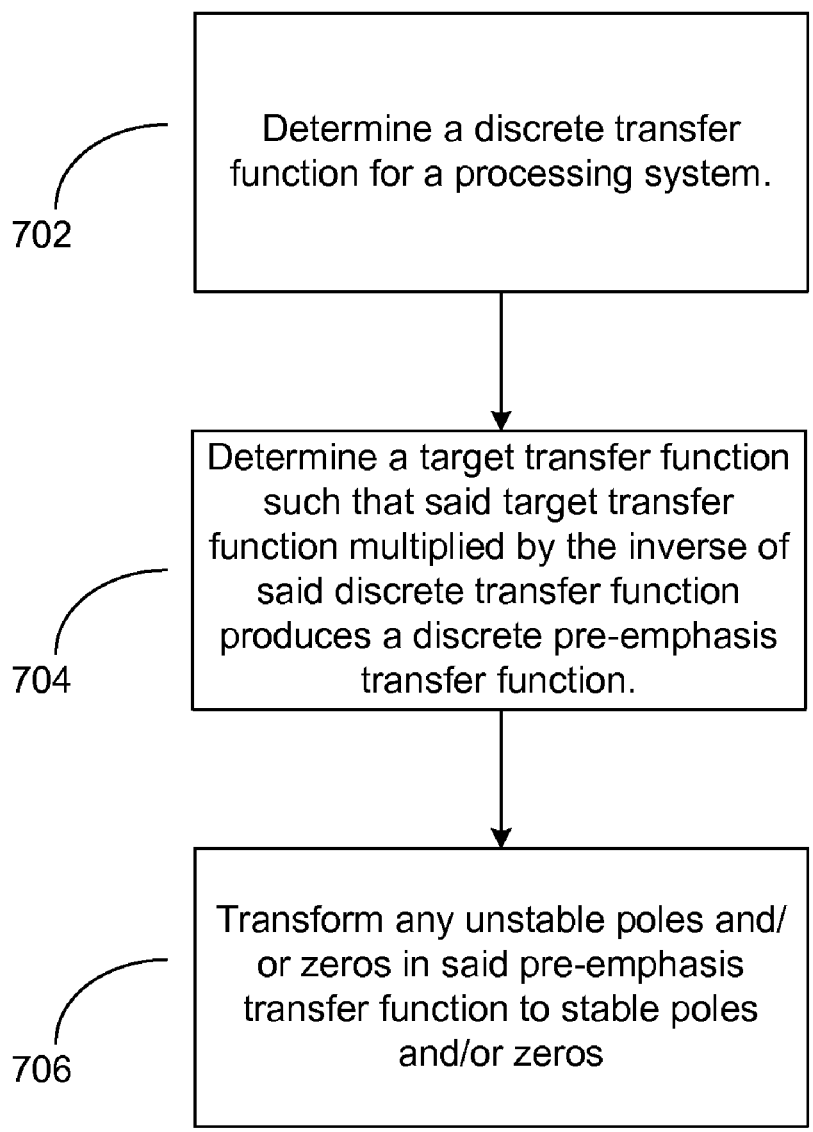
FIG. 7 shows an embodiment of a logic flow.

FIG. 7 illustrates one embodiment of a logic flow. FIG. 7 illustrates a logic flow 700. Logic flow 700 may be representative of the operations executed by one or more embodiments described herein. As shown in logic flow 700, a discrete transfer function for a processing system is determined at 702. A target transfer function is determined at 704 such that said target transfer function multiplied by the inverse of said discrete transfer function produces a discrete pre-emphasis transfer function. At 706 any unstable poles and/or zeros in said pre-emphasis transfer function are transformed to stable poles and/or zeros. In various embodiments said target transfer function represents a low pass FIR filter having a gain of about unity across substantially all of the frequency range of said FIR filter, and said target transfer function to emphasize a portion of an electromagnetic signal prior to being processed in a processing system.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. One of ordinary skill in the art will accordingly appreciate that embodiments of the invention or various components and/or features thereof may be entirely comprised of hardware, software and/or may be a combination of software and hardware.

Accordingly each of the blocks of the drawings, and combinations of blocks of the drawings, may be embodied in many different ways, as is well known to those of skill in the art.

The foregoing description is by way of example only, and not limiting. The invention is limited only as defined in the following claims and equivalents thereto.

What is claimed is:

1. A method of determining a transfer function used for emphasizing a portion of an electromagnetic signal prior to being processed in a processing system comprising the steps of:
   determining a discrete transfer function for said processing system;
   determining a target transfer function such that said target transfer function multiplied by the inverse of said discrete transfer function produces a discrete pre-emphasis transfer function; and
   transforming any unstable poles and/or zeros in said pre-emphasis transfer function to stable poles and/or zeros;
   wherein said target transfer function represents a low pass FIR filter having a gain of about unity across substantially all of the frequency range of said FIR filter.

2. The method of claim 1, wherein said discrete transfer function is determined using one of an S-function, input and output signals, inverse-invariant method, or Steiglitz-McBride algorithm.

3. The method of claim 1, wherein said transformation of said unstable poles and/or zeros is accomplished using an all pass filter.

4. The method of claim 1, wherein said processing system comprises one of phase modulation, or wideband phase modulation, wideband fractional sigma delta modulation, or wideband fractional sigma delta modulation for a code division multiple access signal.

5. A method for electromagnetic processing of an input wave, wherein an input signal containing a characteristic of said input wave is processed to produce a modified signal, said method comprising the steps of:
   receiving said input signal containing said characteristic of said input wave;
   transforming said input signal using a pre-emphasis transfer function based upon determining a discrete transfer function for said processing of said input signal, determining a target transfer function such that said target transfer function multiplied by the inverse of said discrete transfer function produces said pre-emphasis transfer function, and transforming any unstable poles and/or zeros in said pre-emphasis transfer function to stable poles and/or zeros, wherein said target transfer function represents a low pass FIR filter having a gain of about unity across substantially all of the frequency range of said FIR filter;
   processing said transformed input signal to generate said modified signal; and
   regulating said modified signal using a control signal containing another characteristic of said input wave to produce an output signal.

6. The method of claim 5, wherein said discrete transfer function is determined using one of an S-function, input and output signals, inverse-invariant method, Steiglitz-McBride algorithm.

7. The method of claim 5, wherein said transformation of said unstable poles and/or zeros is accomplished using an all pass filter.

8. The method of claim 5, wherein said modified signal is a phase modulated signal and said processing involves one of phase modulation, wideband phase modulation, wideband fractional sigma delta modulation, or wideband fractional sigma delta modulation for a code division multiple access signal.

9. The method of claim 5, wherein said characteristic used to regulate said modified signal is magnitude.

10. The method of claim 5, wherein said step of regulating said modified signal is performed using a plurality of segments.

11. The method of claim 10, wherein one or more of said segments is independently controlled as a power amplifier by a portion of two or more signals that represent said input wave to contribute power to said output signal.

12. The method of claim 11, further comprising the step of generating said output signal by combining power outputted from one or more of said segments.

13. The method of claim 12, wherein said step of generating said output signal by combining power is accomplished using one of power transformers, quarter-wave transmission lines, or discrete LC components.

14. The method of claim 10, wherein one or more of said segments is independently controlled as a current source by a portion of two or more signals that represent said input wave to contribute current to said output signal.

15. A method of determining a transfer function used for emphasizing a phase signal from an input wave prior to being modulated in a phase modulator, said method comprising the steps of:
   determining a discrete transfer function for said phase modulator;
   determining a target transfer function such that said target transfer function multiplied by the inverse of said discrete transfer function produces a discrete pre-emphasis transfer function; and
   transforming any unstable poles and/or zeros in said pre-emphasis transfer function to stable poles and/or zeros;
   wherein said target transfer function represents a low pass FIR filter having a gain of about unity across substantially all of the frequency range of said FIR filter.

16. The method of claim 15, wherein said discrete transfer function is determined using one of an S-function, input and output signals, inverse-invariant method, or Steiglitz-McBride algorithm.

17. The method of claim 15, wherein said transformation of said unstable poles and/or zeros is accomplished using an all pass filter.

18. An apparatus for electromagnetic processing of an input wave, wherein an input signal containing a characteristic of said input wave is processed in a processing circuit to produce a modified signal, said apparatus comprising:
   a filter for receiving said input signal containing said characteristic of said input wave; and transforming said input signal using a pre-emphasis transfer function based upon determining a discrete transfer function for said processing of said input signal, determining a target transfer function such that said target transfer function multiplied by the inverse of said discrete transfer function produces pre-emphasis transfer function, and transforming any unstable poles and/or zeros in said pre-emphasis transfer function to stable poles and/or zeros, wherein said target transfer fUnction represents a low pass FIR filter having a gain of about unity across substantially all of the frequency range of said FIR filter;
   a processing circuit for processing said input signal after said transformation in said filter to generate said modified signal; and
   an output circuit for regulating said modified signal using a control signal containing another characteristic of said input wave to produce an output signal.

19. The apparatus of claim 18, wherein said discrete transfer function is determined using one of an S-function, input and output signals, inverse-invariant method, or Steiglitz-McBride algorithm.

20. The apparatus of claim 18, wherein said transformation of said unstable poles and/or zeros is accomplished using an all pass filter.

21. The apparatus of claim 18, wherein said modified signal is a phase modulated signal and said processing circuit is one of a phase locked loop, a phase modulator, a wideband phase modulator, a wideband fractional sigma delta modulator, or a wideband fractional sigma delta modulator for a code division multiple access signal.

22. The apparatus of claim 18, wherein said characteristic used to regulate said modified signal is magnitude.

23. The apparatus of claim 18, wherein said output circuit is an amplifier comprising a plurality of segments.

24. The apparatus of claim 23, wherein one or more of said segments is independently controlled as a power amplifier by said control signal to contribute power to said output signal, wherein said output circuit further comprises a combining circuit for combining the output from each of said segments to generate said output signal, and wherein said combining circuit comprises one of power transformers, quarter-wave transmission lines, or discrete LC components.

25. The apparatus of claim 23, wherein one or more of said segments is independently controlled as a current source by a portion of two or more signals that represent said input wave to contribute current to said output signal.

26. A signal transmitter comprising:
   a baseband processor for receiving an input wave and generating a magnitude signal and a phase signal representing said input wave;
   a phase modulator for phase modulating said phase signal, said phase modulator having a modulator transfer function associated therewith;
   a filter for transforming said phase signal prior to being modulated in said phase modulator, said filter having a pre-emphasis transfer function based upon determining a discrete transfer function from said modulator transfer function, determining a target transfer function such that said target transfer function multiplied by the inverse of said discrete transfer function produces said pre-emphasis transfer function, and transforming any unstable poles and/or zeros in said pre-emphasis transfer function to stable poles and/or zeros, wherein said target transfer function represents a low pass FIR filter having a gain of about unity across substantially all of the frequency range of said FIR filter; and
   an amplifier comprising a plurality of segments for amplifying said phase modulated signal transformed by said filter using said magnitude signal to generate an output signal for transmission.

27. The transmitter of claim 26, wherein said discrete transfer function is determined using one of an S-function, input and output signals, inverse-invariant method, or Steiglitz-McBride algorithm.

28. The transmitter of claim 26, wherein said transformation of said unstable poles and/or zeros is accomplished using an all pass filter.

29. The transmitter of claim 26 futher comprising a combining circuit for combining the output from each of said segments to generate said output signal, wherein said combining circuit comprises one of power transformers, quarter-wave transmission lines, or discrete LC components.

30. The apparatus of claim 26, wherein one or more of said segments is independently controlled as a current source by a portion of two or more signals that represent said input wave to contribute current to said output signal.

* * * * *